(12) United States Patent
Liu

(10) Patent No.: US 9,085,312 B2
(45) Date of Patent: Jul. 21, 2015

(54) COLLAPSIBLE STROLLER WITH REVERSIBLE SEAT

(71) Applicant: Unitron Enterprises Zhuhai Co., Ltd., Zhuhai (CN)

(72) Inventor: Xiuping Liu, Zhuhai (CN)

(73) Assignee: Unitron Enterprises Zhuhai Co., Ltd, Guangdong (CN)

( * ) Notice: Subject to any disclaimer, the term of this patent is extended or adjusted under 35 U.S.C. 154(b) by 0 days.

(21) Appl. No.: 14/386,072

(22) PCT Filed: Mar. 13, 2013

(86) PCT No.: PCT/CN2013/072509
§ 371 (c)(1),
(2) Date: Sep. 18, 2014

(87) PCT Pub. No.: WO2013/139218
PCT Pub. Date: Sep. 26, 2013

(65) Prior Publication Data
US 2015/0048599 A1   Feb. 19, 2015

(30) Foreign Application Priority Data

Mar. 19, 2012   (CN) .......................... 2012 1 0073708

(51) Int. Cl.
*B62B 7/06* (2006.01)
*B62B 7/08* (2006.01)
*B62B 7/14* (2006.01)

(52) U.S. Cl.
CPC . *B62B 7/062* (2013.01); *B62B 7/08* (2013.01); *B62B 7/142* (2013.01); *B62B 7/145* (2013.01); *B62B 7/064* (2013.01)

(58) Field of Classification Search
CPC .......... B62B 7/06; B62B 7/062; B62B 7/145; B62B 7/08; B62B 7/14; B62B 7/142; B62B 2205/22

See application file for complete search history.

(56) References Cited

U.S. PATENT DOCUMENTS

| 4,449,732 A | 5/1984 | Surot |
| 6,513,827 B1 * | 2/2003 | Barenbrug ..................... 280/648 |

(Continued)

FOREIGN PATENT DOCUMENTS

| CN | 2292723 Y | 9/1998 |
| CN | 1311119 A | 9/2001 |

(Continued)

OTHER PUBLICATIONS

International Search Report mailed May 30, 2013 for PCT/CN2013/072509 filed Mar. 13, 2013.

(Continued)

*Primary Examiner* — Brodie Follman
(74) *Attorney, Agent, or Firm* — Kacvinsky Daisak Bluni Pllc

(57) ABSTRACT

A collapsible stroller, including a handle tube, a front leg tube with a front wheel assembly, a rear leg tube with a rear wheel assembly, a joint assembly connecting the handle tube to the front leg tube and the rear leg tube, and a reversible seat reversibly mounted on the joint assembly, characterized in that the reversible seat is provided with an engaging projection, and the joint assembly is provided with more than one engaging recess rotatable with a stroller frame, and that the stroller frame can be collapsed after the engaging projection of the reversible seat is inserted into the engaging recess, and the rotation of the stroller frame brings the reversible seat to rotate therewith, so that the reversible seat is collapsed along with the stroller frame.

10 Claims, 7 Drawing Sheets

(56) References Cited

U.S. PATENT DOCUMENTS

| | | | |
|---|---|---|---|
| 7,267,359 B1 * | 9/2007 | Yang et al. | 280/642 |
| 7,367,581 B2 * | 5/2008 | Yang | 280/642 |
| 7,377,537 B2 * | 5/2008 | Li | 280/650 |
| 7,401,803 B1 * | 7/2008 | Lai | 280/647 |
| 7,584,985 B2 * | 9/2009 | You et al. | 280/643 |
| 7,766,366 B2 * | 8/2010 | Li | 280/642 |
| 7,798,500 B2 * | 9/2010 | Den Boer | 280/47.34 |
| 8,061,732 B2 * | 11/2011 | Song et al. | 280/650 |
| 8,087,689 B2 * | 1/2012 | Fritz et al. | 280/647 |
| 8,128,119 B2 * | 3/2012 | Saville et al. | 280/648 |
| 8,157,286 B2 * | 4/2012 | Lai | 280/647 |
| 8,251,382 B2 * | 8/2012 | Chen et al. | 280/47.41 |
| 8,371,606 B2 * | 2/2013 | Gower et al. | 280/647 |
| 8,474,854 B2 * | 7/2013 | Dean et al. | 280/647 |
| 8,596,669 B2 * | 12/2013 | Liao | 280/647 |
| 8,672,341 B2 * | 3/2014 | Offord | 280/650 |
| 8,870,213 B1 * | 10/2014 | Xu | 280/642 |
| 8,985,616 B1 * | 3/2015 | Chen | 280/642 |
| 8,991,854 B2 * | 3/2015 | Greger et al. | 280/650 |
| 9,010,773 B2 * | 4/2015 | Horst et al. | 280/47.38 |
| 2008/0150247 A1 * | 6/2008 | Lake | 280/47.41 |
| 2008/0179848 A1 * | 7/2008 | Lake | 280/47.41 |
| 2009/0121455 A1 * | 5/2009 | Kretschmer et al. | 280/642 |
| 2010/0025968 A1 * | 2/2010 | Fritz et al. | 280/647 |
| 2011/0204600 A1 | 8/2011 | Lai | |
| 2013/0113185 A1 * | 5/2013 | Zehfuss | 280/647 |
| 2015/0048599 A1 * | 2/2015 | Liu | 280/642 |
| 2015/0076795 A1 * | 3/2015 | Liu | 280/642 |

FOREIGN PATENT DOCUMENTS

| | | |
|---|---|---|
| CN | 2668468 Y | 1/2005 |
| CN | 2730711 Y | 10/2005 |
| CN | 2780577 Y | 5/2006 |
| CN | 101125555 A | 2/2008 |
| CN | 101553391 A | 10/2009 |
| CN | 201530404 U | 7/2010 |
| CN | 201769851 U | 3/2011 |
| CN | 202038340 U | 8/2011 |
| CN | 202541613 U | 11/2012 |
| DE | 202011108040 U1 | 3/2012 |
| EP | 0494736 A2 | 7/1992 |
| EP | 2096016 A2 | 9/2009 |
| FR | 2503070 A2 | 10/1982 |
| JP | 10-035507 A | 2/1998 |

OTHER PUBLICATIONS

Chinese Office Action dated Jan. 29, 2015 for Application No. 201210073708.0 filed on Mar. 19, 2012.

* cited by examiner

COLLAPSIBLE STROLLER WITH REVERSIBLE SEAT

FIELD OF THE DISCLOSURE

Embodiments of the present disclosure relate generally to a collapsible stroller, in particular a stroller with a reversible seat

BACKGROUND OF THE DISCLOSURE

With regard to some strollers with reversible seat in the market, the stroller frame can only be collapsed after the reversible seat is removed. With regard to some other strollers with reversible seat in the market, the stroller frame can only be collapsed when the reversible seat is mounted in a given orientation. If the stroller frame is collapsed when the reversible seat is mounted in a different orientation, the reversible seat will significantly protrude outside the stroller frame and thus will not be snugly collapsed along with the stroller frame, resulting in the inconvenience for the use's collapsing of the stroller frame, the inconvenience for carrying and storage, and the annoyance for the parents.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

The disclosure provides a collapsible stroller with a reversible seat. The reversible seat in any mounting orientation can be collapsed along with the stroller frame. Thus, the parents using such a stroller with the reversible seat can collapse the reversible seat along with the stroller frame, irrespective of the mounting orientation of the reversible seat. The stroller of the disclosure is simple, reliable, easy to use, and inexpensive.

A collapsible stroller, including a handle tube, a front leg tube with a front wheel assembly, a rear leg tube with a rear wheel assembly, a joint assembly connecting the handle tube to the front leg tube and the rear leg tube, and a reversible seat reversibly mounted on the joint assembly, characterized in that the reversible seat is provided with an engaging projection, and the joint assembly is provided with more than one engaging recess rotatable a stroller frame; and that the stroller frame can be collapsed after the engaging projection of the reversible seat is inserted into the engaging recess, and the rotation of the stroller frame brings the reversible seat to rotate therewith, so that the reversible seat is collapsed along with the stroller frame.

According to an embodiment, the joint assembly is provided with at least two engaging recesses, in which a first engaging recess is provided on a joint attached to the front leg tube or the handle tube, and a second engaging recess is provided on the rear leg tube or on a joint attached to the rear leg tube.

According to an embodiment, the joint assembly may include an upper joint fixedly attached to the handle tube; a lower joint fixedly attached to the front leg tube; a joint cover fixedly attached to the rear leg tube, wherein the upper joint and the lower joint can pivot about an axis on the joint cover; and a stroller safety lock for controlling the pivoting of the upper joint and the lower joint about the axis on the joint cover. According to an embodiment, the reversible seat can be mounted in a forward orientation, with the engaging projection inserted into an engaging recess on a joint fixedly attached to the front leg tube or the handle tube, and wherein the stroller frame is collapsed by operating a stroller safety lock, the engaging recess on the joint fixedly attached to the front leg tube or the handle tube moves the reversible seat, and the reversible seat approaches the rear leg tube and thus is collapsed along with the stroller frame.

According to an embodiment, the reversible seat can be mounted in a rearward orientation, with the engaging projection inserted into an engaging recess on a joint fixedly attached to the rear leg tube, and wherein the stroller frame is collapsed by operating a stroller safety lock, and the reversible seat is collapsed along with the rear leg tube and thus along with the stroller frame.

According to an embodiment, the engaging projection on the reversible seat and the engaging recess are provided with corresponding convex and concave configuration, so as to facilitate the positioning thereof and prevent the insertion into an erroneous engaging recess during the reversing of the reversible seat.

BRIEF DESCRIPTION OF THE DRAWINGS

By way of example, various embodiments of the disclosed device will now be described, with reference to the accompanying drawings, in which.

DETAILED DESCRIPTION

Figure 1:
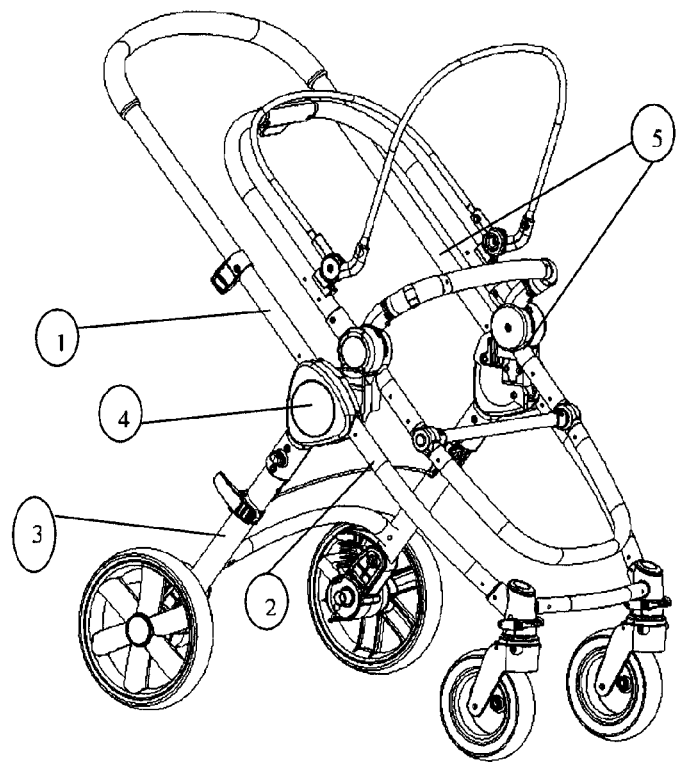
FIG. 1 is a perspective view of the stroller frame.
Figure 2:
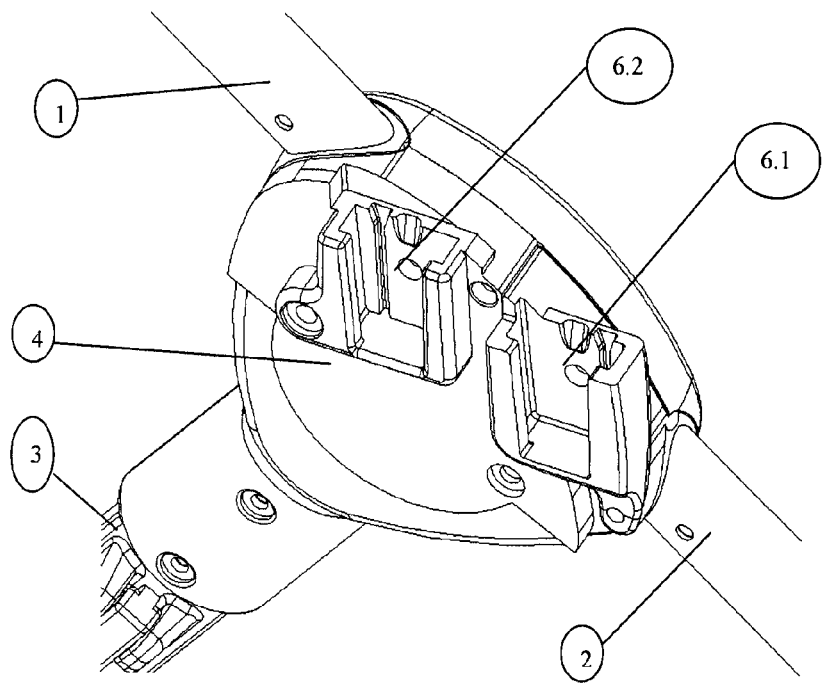
FIG. 2 is a schematic view showing the positions of the engaging recesses in the joint assembly.

The principle of the first preferred embodiment of the present disclosure is described as follows.

A first embodiment relates to a collapsible stroller, which may include a handle tube 1, a front leg tube 2 with a front wheel assembly, a rear leg tube 3 with a rear wheel assembly, a joint assembly 4 connecting the handle tube 1 to the front leg tube 2 and the rear leg tube 3, and a reversible seat 5 reversibly mounted on the joint assembly 4. The reversible seat 5 is provided with an engaging projection 7, and the joint assembly 4 is provided with more than one engaging recess 6.1 and 6.2 rotatable with the stroller frame. The stroller frame can be collapsed after the engaging projection 7 of the reversible seat 5 is inserted into the engaging recess 6.1 or 6.2. The rotating stroller frame brings the reversible seat 5 to rotate therewith, so that the reversible seat 5 is collapsed along with the stroller frame. The details are shown in FIGS. 1-4, 6 and 10.

Figure 3:
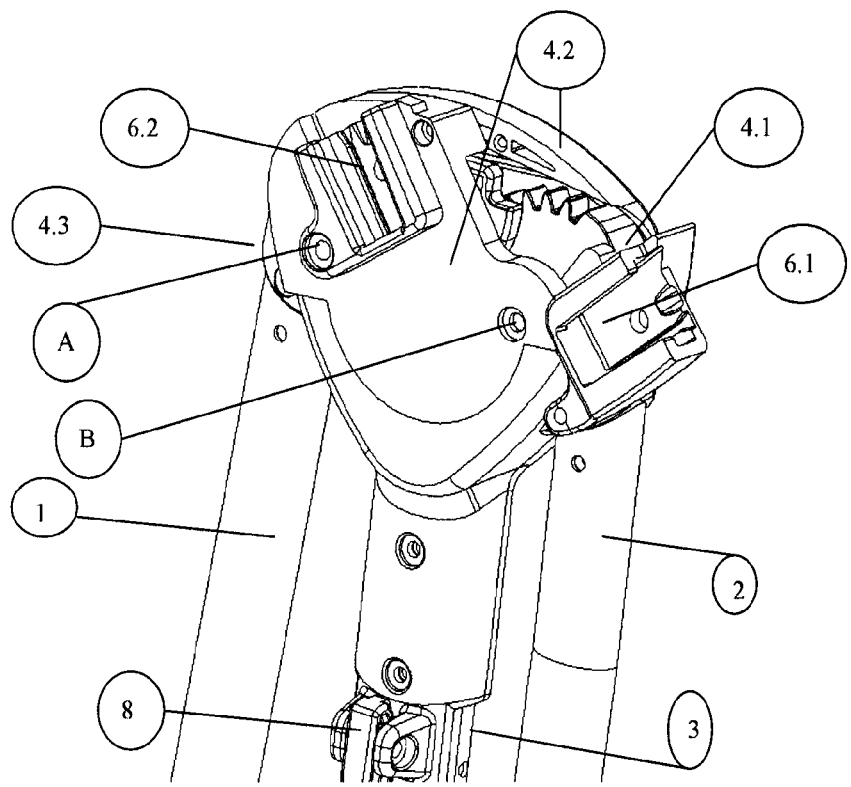
FIG. 3 is a schematic view showing the configuration of the joint assembly and the rotation of the engaging recesses.

The joint assembly 4 in the first embodiment is provided with at least two engaging recesses 6.1 and 6.2, wherein one engaging recess 6.1 is provided on a lower joint 4.1 fixedly attached to the front leg tube, and the other engaging recess 6.2 is provided on a joint cover 4.2 fixedly attached to the rear leg tube 3. The details are shown in FIG. 3.

The joint assembly 4 in the first embodiment may include an upper joint 4.3 fixedly attached to the handle tube; the lower joint 4.1 fixedly attached to the front leg tube; the joint cover 4.2 fixedly attached to the rear leg tube 3, wherein the upper joint 4.3 and the lower joint 4.1 can pivot about an axis A and B on the joint cover 4.2 respectively; and a stroller safety lock 8 for controlling the pivoting of the upper joint 4.3 and the lower joint 4.1 about the axis A and B on the joint cover 4.2. The details are shown in FIG. 3.

Figure 4:
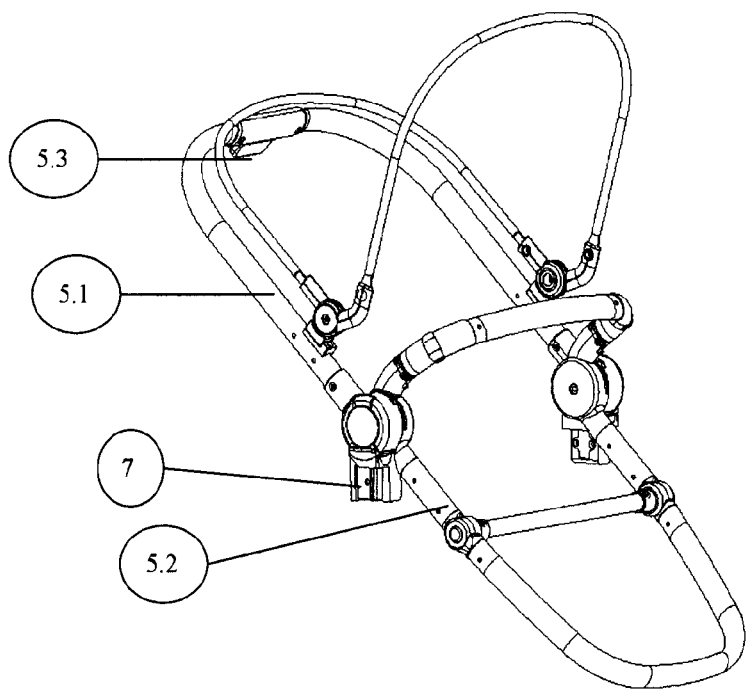
FIG. 4 is a schematic view showing the configuration of the reversible seat.
Figure 5:
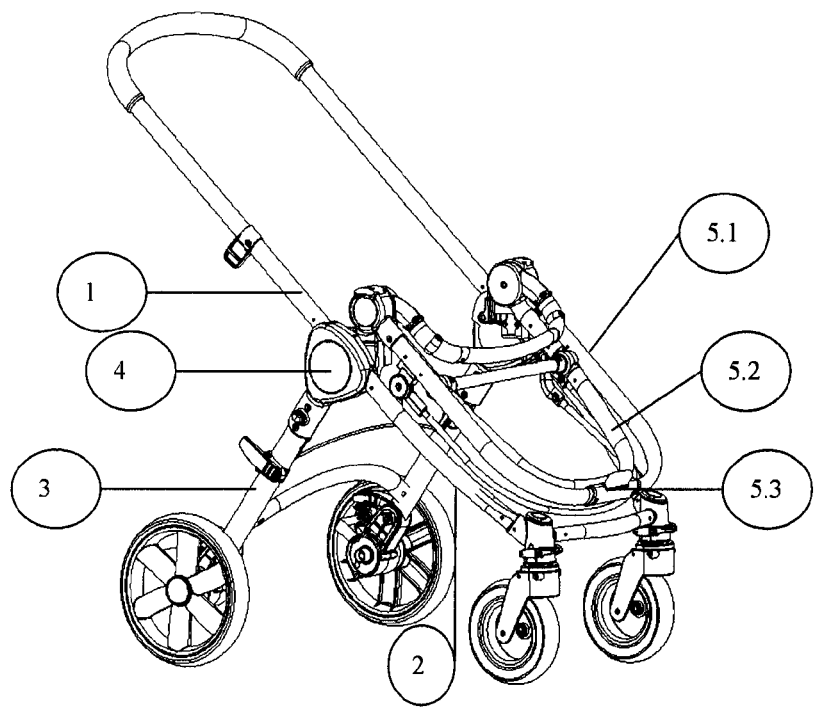
FIG. 5 is a schematic perspective view showing the collapsing of the backrest portion toward the seating portion of the reversible seat.
Figure 6:
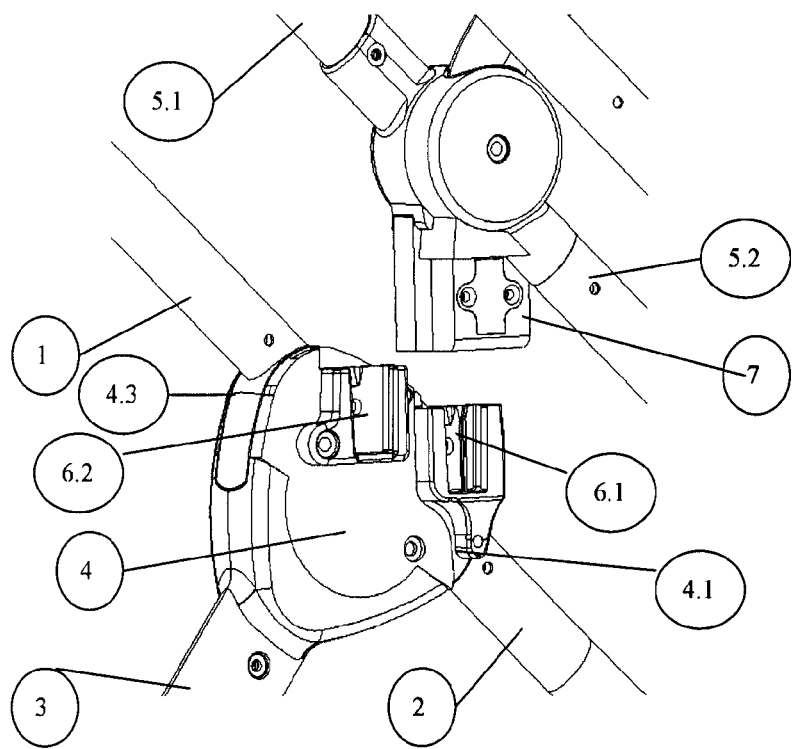
FIG. 6 is a schematic view showing the configuration of the engaging projection and the engaging recesses when the reversible seat is to be mounted in a forward orientation.
Figure 7:
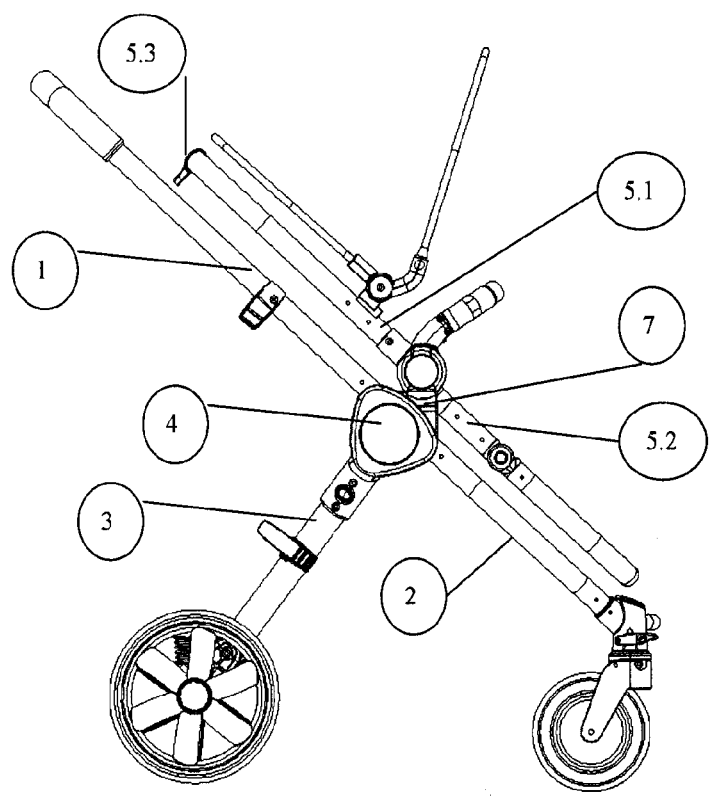
FIG. 7 is a schematic side view showing the reversible seat mounted in a forward orientation, with the engaging projection inserted into an engaging recess.
Figure 8:
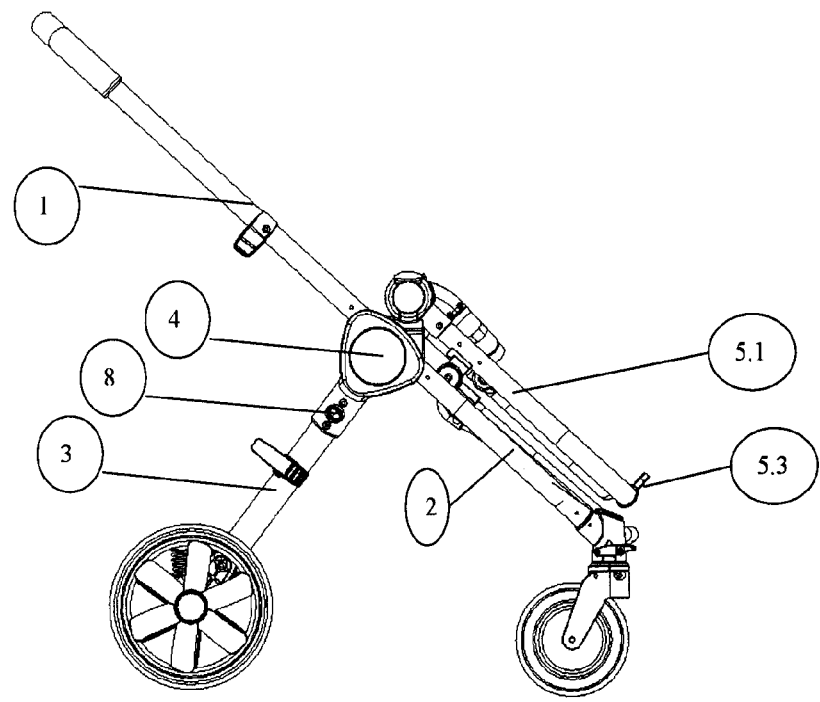
FIG. 8 is a schematic view showing the collapsing of the backrest portion toward the seating portion when the reversible seat is mounted in a forward orientation.
Figure 9:
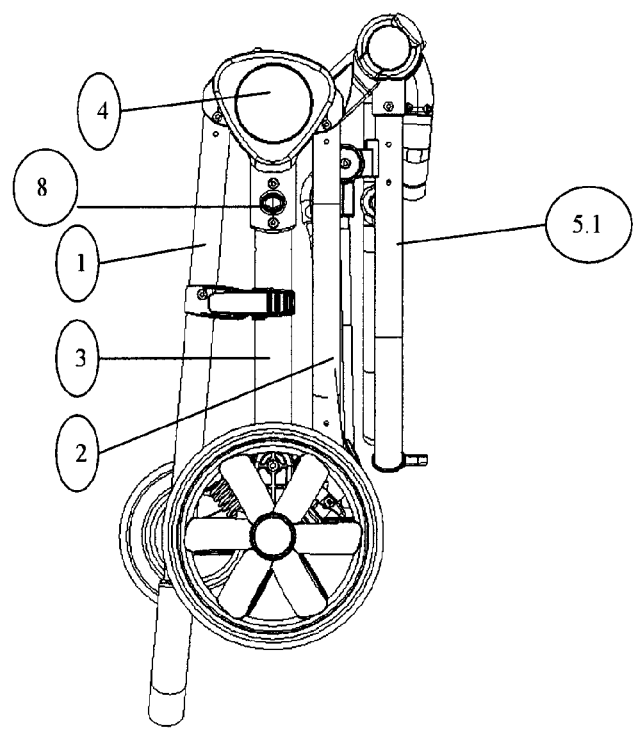
FIG. 9 is a schematic view showing the collapsing of the backrest portion toward the seating portion and the collapsing of the reversible seat along with the front leg tube toward the rear leg tube when the reversible seat is mounted in a forward orientation.
Figure 10:
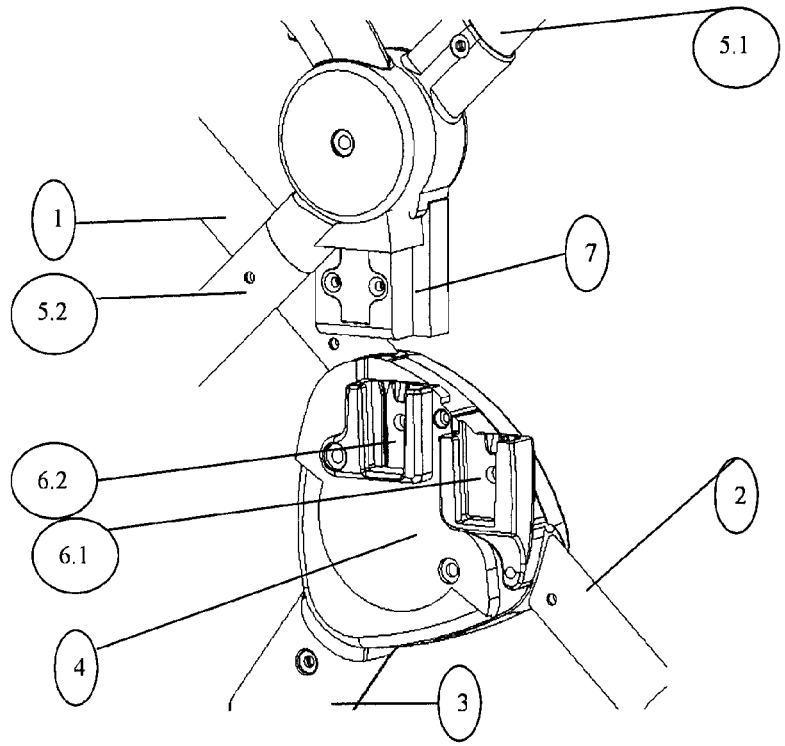
FIG. 10 is a schematic view showing the configuration of the engaging projection and the engaging recesses when the reversible seat is to be mounted in a rearward orientation.
Figure 11:
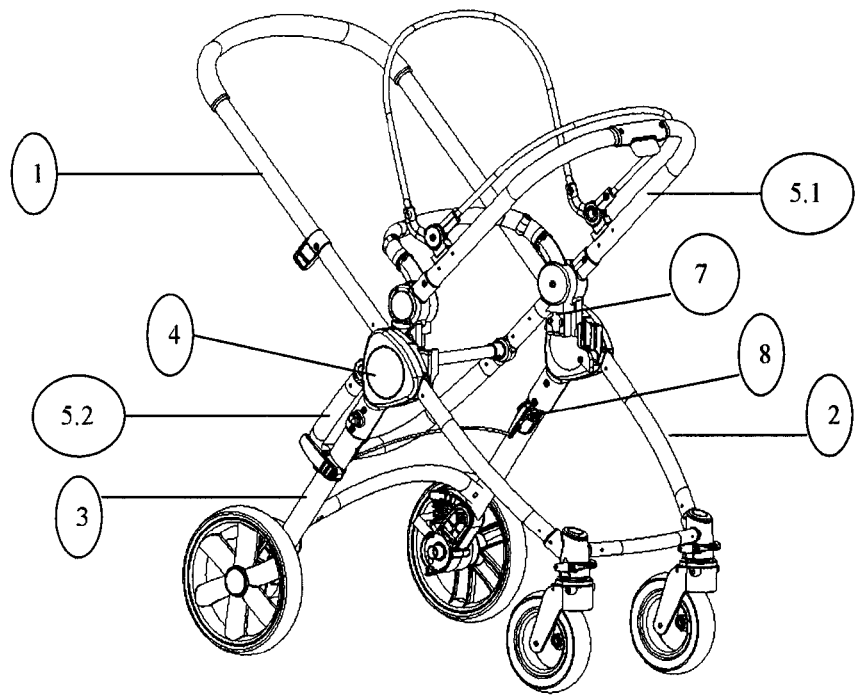
FIG. 11 is a schematic perspective view showing the reversible seat mounted in a rearward orientation, with the engaging projection inserted into an engaging recess.
Figure 12:
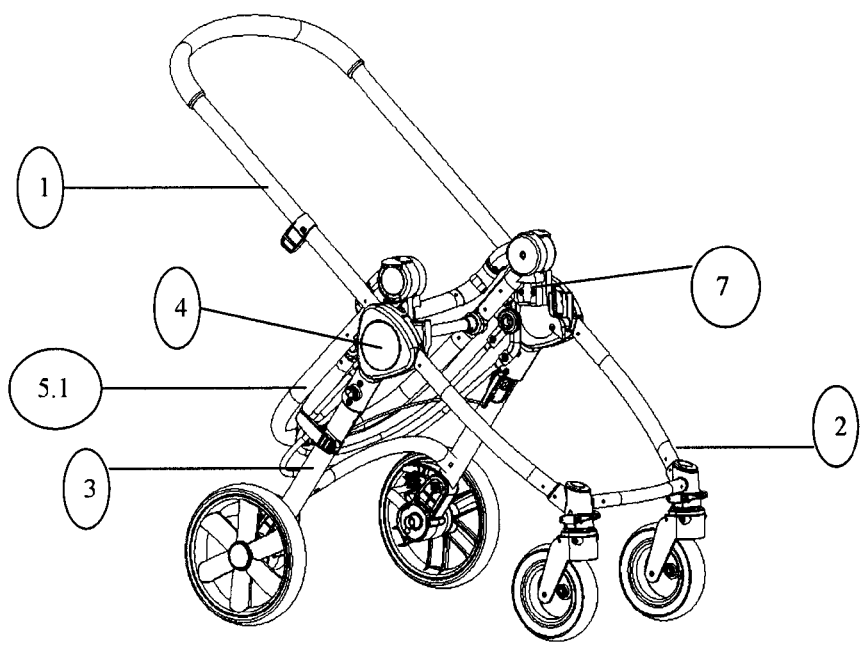
FIG. 12 is a schematic perspective view showing the collapsing of the backrest portion toward the seating portion when the reversible seat is mounted in a rearward orientation.
Figure 13:
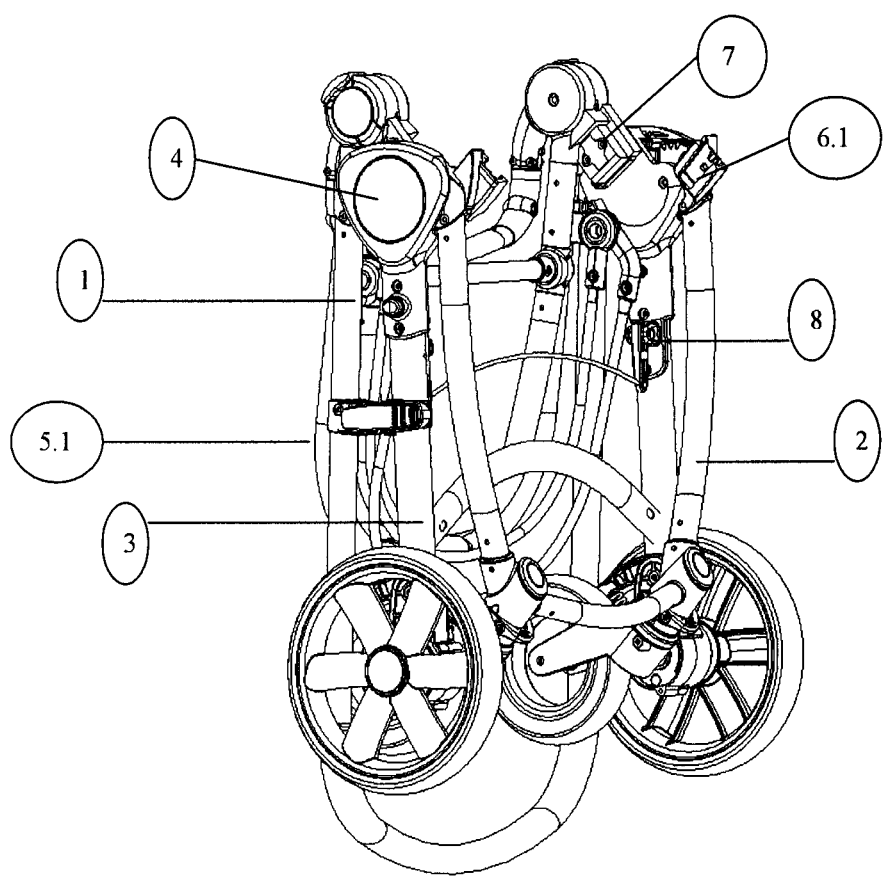
FIG. 13 is a schematic perspective view showing the collapsing of the backrest portion toward the seating portion and the collapsing of the reversible seat along with the rear leg tube when the reversible seat is mounted in a rearward orientation.

A backrest portion 5.1 and a seating portion 5.2 of the reversible seat 5 are collapsible. A seat safety lock 5.3 is provided on the reversible seat 5 for controlling the collapsing of the backrest portion 5.1 and the seating portion 5.2. After the release of the seat safety lock 5.3, the backrest portion 5.1 and the seating portion 5.2 can be collapsed. The details are shown in FIGS. 4-5.

The reversible seat 5 in the first embodiment may be mounted in a forward orientation, with the engaging projection 7 inserted into the engaging recess 6.1 on the lower joint 4.1 fixedly attached to the front leg tube 2. Before the collapsing of the stroller frame, the seat safety lock 5.3 on the reversible seat 5 is released and the backrest portion 5.1 and the seating portion 5.2 are collapsed. Then, the stroller frame is collapsed by operating the stroller safety lock 8, and the reversible seat 5 along with the front leg tube 2 approaches the rear leg tube 3. The details are shown in FIGS. 6-9.

The reversible seat 5 in the first embodiment may also be mounted in a rearward orientation, with the engaging projection 7 inserted into the engaging recess 6.2 on the joint cover 4.2 fixedly attached to the rear leg tube 3. Before the collapsing of the stroller frame, the seat safety lock 5.3 on the reversible seat 5 is released and the backrest portion 5.1 and the seating portion 5.2 are collapsed. Then, the stroller frame is collapsed by operating the stroller safety lock 8, and the reversible seat 5 is collapsed along with the rear leg tube 3. The details are shown in FIGS. 10-13.

In the first embodiment, the engaging projection 7 on the reversible seat 5 and the engaging recesses 6.1 and 6.2 are provided with guiding parts respectively having corresponding convex and concave configuration, so as to facilitate the positioning of the engaging projection and the engaging recesses and prevent the erroneous insertion into the engaging recess 6.1 or 6.2 during the reversal mounting of the reversible seat 5.

As the second embodiment of the disclosure, the engaging recess 6.1 for receiving the engaging projection of the reversible seat is provided on the joint fixedly attached to the handle tube 1, and other structures and the principle are similar to those in the first embodiment.

As the third embodiment, before the collapsing of the stroller frame, the backrest portion and the seating portion of the reversible seat need not to be collapsed first, or the backrest portion and the seating portion of the reversible seat are non-collapsible. Other structures and the principle are similar to those in the first embodiment.

As the fourth embodiment of the disclosure, both the upper joint and the lower joint pivot about only one axis on the joint cover. Other structures and the principle are similar to those in the first embodiment.

As the fifth embodiment of the disclosure, the joint assembly may include an upper joint, which is fixedly attached to the handle tube, movably attached to the rear leg tube, and pivotable along with the handle tube about the movable junction on the rear leg tube; a lower joint which is fixedly attached to the front leg tube and is pivotable along with the front leg tube about a movable junction on a seat mount of the stroller frame; and a stroller safety lock for controlling the release of the upper joint and the lower joint. A first engaging recess rotatable with the stroller frame is provided on the lower joint fixedly attached to the front leg tube, and a second engaging recess is provided on the upper joint fixedly attached to the handle tube. The engagement of the engaging projection on the reversible seat and the collapsing principle are similar to those in the first embodiment.

As the sixth embodiment of the disclosure, the joint assembly may include a handle joint movably connecting the handle tube to the front leg tube and the rear leg tube, wherein the handle tube is pivotable about a movable junction on the handle joint, and the front leg tube and the rear leg tube are pivotable about a movable junction on the handle tube and the seat mount of the stroller frame; and a stroller safety lock for controlling the pivoting of the handle tube. A first engaging recess rotatable with the stroller frame is fixed on the upper section of the front leg tube, and a second engaging recess is provided on the handle joint or fixed on the upper section of the rear leg tube. The engagement of the engaging projection on the reversible seat and the collapsing principle are similar to those in the first embodiment.

By way of the six embodiments set forth above, collapsing the stroller frame together with the reversible seat by means of more than one engaging recess falls within the scope of the disclosure, no matter the engaging recess is provided on the joint for collapsing the stroller frame, the front leg tube, the rear leg tube or the handle tube and no matter the backrest portion and the seating portion of the reversible seat are collapsible. As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, various other embodiments of and modifications to the present disclosure, in addition to those described herein, will be apparent to those of ordinary skill in the art from the foregoing description and accompanying drawings. These other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A collapsible stroller, comprising:
   a handle tube;
   a front leg tube with a front wheel assembly;
   a rear leg tube with a rear wheel assembly;
   a joint assembly connecting the handle tube to the front leg tube and the rear leg tube; and
   a reversible seat reversibly mounted on the joint assembly, wherein the reversible seat is provided with an engaging projection, and the joint assembly is provided with more than one engaging recess rotatable a stroller frame, and that the stroller frame can be collapsed after the engaging projection of the reversible seat is inserted into the engaging recess, and the rotation of the stroller frame brings the reversible seat to rotate therewith, so that the reversible seat is collapsed along with the stroller frame.

2. The collapsible stroller according to claim 1, wherein the joint assembly is provided with at least two engaging recesses, in which a first engaging recess is provided on a joint attached to the front leg tube or the handle tube, and a second engaging recess is provided on the rear leg tube or on a joint attached to the rear leg tube.

3. The collapsible stroller according to claim 1, wherein the joint assembly comprises:
   an upper joint fixedly attached to the handle tube;
   a lower joint fixedly attached to the front leg tube;
   a joint cover fixedly attached to the rear leg tube, wherein the upper joint and the lower joint can pivot about an axis on the joint cover; and
   a stroller safety lock for controlling the pivoting of the upper joint and the lower joint about the axis on the joint cover.

4. The collapsible stroller according to claim 1, wherein the reversible seat can be mounted in a forward orientation, with the engaging projection inserted into an engaging recess on a joint fixedly attached to the front leg tube or the handle tube, and wherein the stroller frame is collapsed by operating a stroller safety lock, the engaging recess on the joint fixedly attached to the front leg tube or the handle tube moves the reversible seat, and the reversible seat approaches the rear leg tube and thus is collapsed along with the stroller frame.

5. The collapsible stroller according to claim 1, wherein the reversible seat can be mounted in a rearward orientation, with the engaging projection inserted into an engaging recess on a joint fixedly attached to the rear leg tube, and wherein the stroller frame is collapsed by operating a stroller safety lock, and the reversible seat is collapsed along with the rear leg tube and thus along with the stroller frame.

6. The collapsible stroller according to claim 1, wherein the engaging projection on the reversible seat and the engaging recess are provided with corresponding convex and concave configuration, so as to facilitate the positioning thereof and prevent the insertion into an erroneous engaging recess during the reversing of the reversible seat.

7. The collapsible stroller according to claim 1, wherein the joint assembly comprises:
   an upper joint, which is fixedly attached to the handle tube, movably attached to the rear leg tube, and pivotable along with the handle tube about a movable junction on the rear leg tube;
   a lower joint which is fixedly attached to the front leg tube and is pivotable along with the front leg tube about a movable junction on a seat mount of the stroller frame; and
   a stroller safety lock for controlling the release of the upper joint and the lower joint.

8. The collapsible stroller according to claim 7, wherein a first engaging recess rotatable with the stroller frame is provided on the lower joint, and a second engaging recess is provided on the upper joint.

9. The collapsible stroller according to claim 1, wherein the joint assembly comprises:
   a handle joint movably connecting the handle tube to the front leg tube and the rear leg tube, the handle tube being pivotable about a movable junction on the handle joint, and the front leg tube and the rear leg tube being pivotable about a movable junction on the handle tube and a seat mount of the stroller frame; and
   a stroller safety lock for controlling the pivoting of the handle tube.

10. The collapsible stroller according to claim 9, wherein a first engaging recess rotatable with the stroller frame is fixed on an upper section of the front leg tube, and a second engaging recess is provided on the handle joint or fixed on an upper section of the rear leg tube.

* * * * *